Oct. 5, 1965  M. T. WORST  3,209,998
REGISTERING SYSTEM
Filed Aug. 12, 1963  7 Sheets-Sheet 1

INVENTOR.
Marc T. Worst
BY
Attorneys

INVENTOR.
Marc T. Worst
BY
Attorneys

Oct. 5, 1965  M. T. WORST  3,209,998
REGISTERING SYSTEM
Filed Aug. 12, 1963  7 Sheets—Sheet 3

INVENTOR.
Marc T. Worst
BY
Attorneys

Oct. 5, 1965

M. T. WORST 3,209,998

REGISTERING SYSTEM

Filed Aug. 12, 1963

INVENTOR.
Marc T. Worst
BY
*Flehr & Swain*
Attorneys

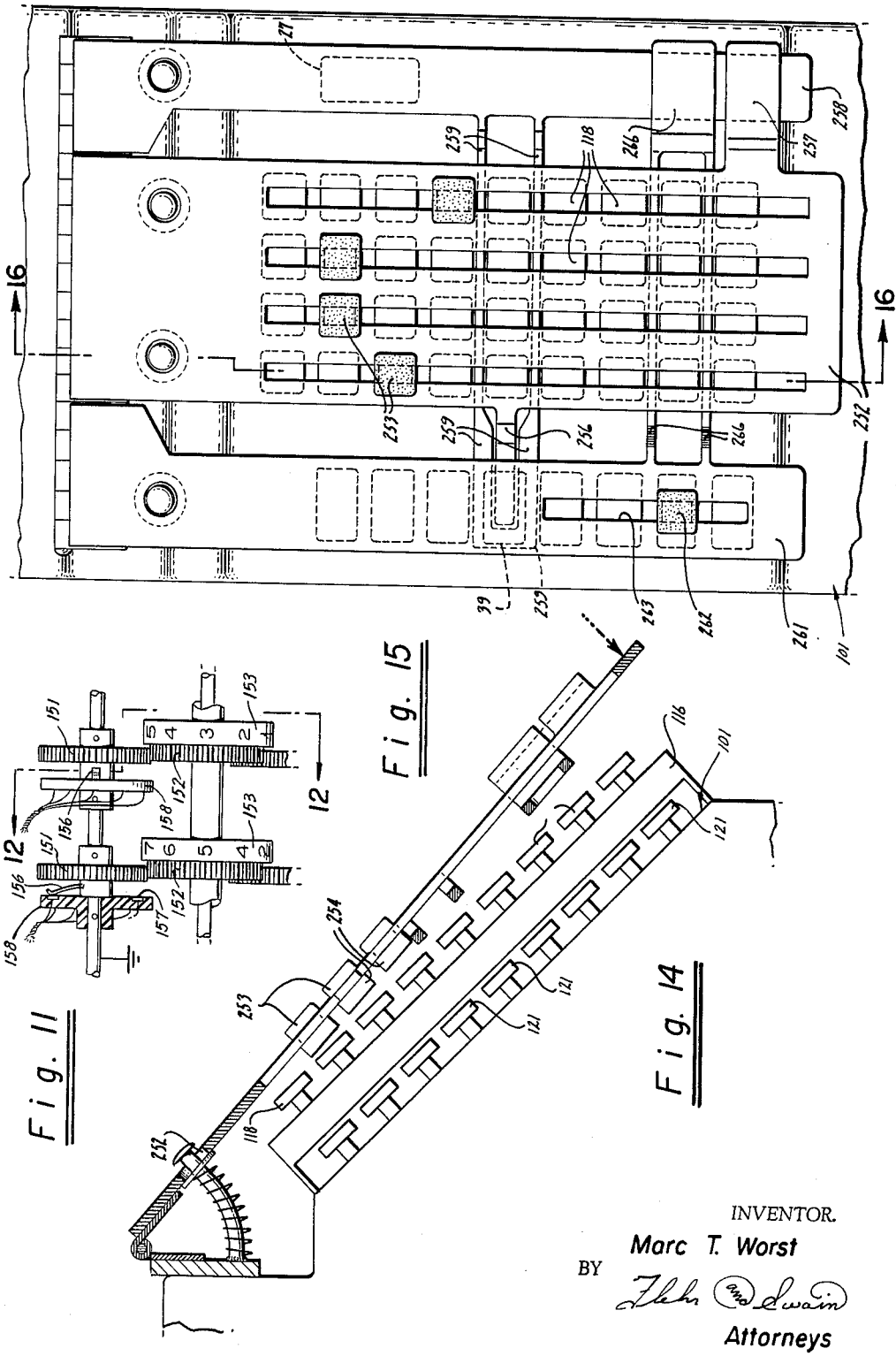

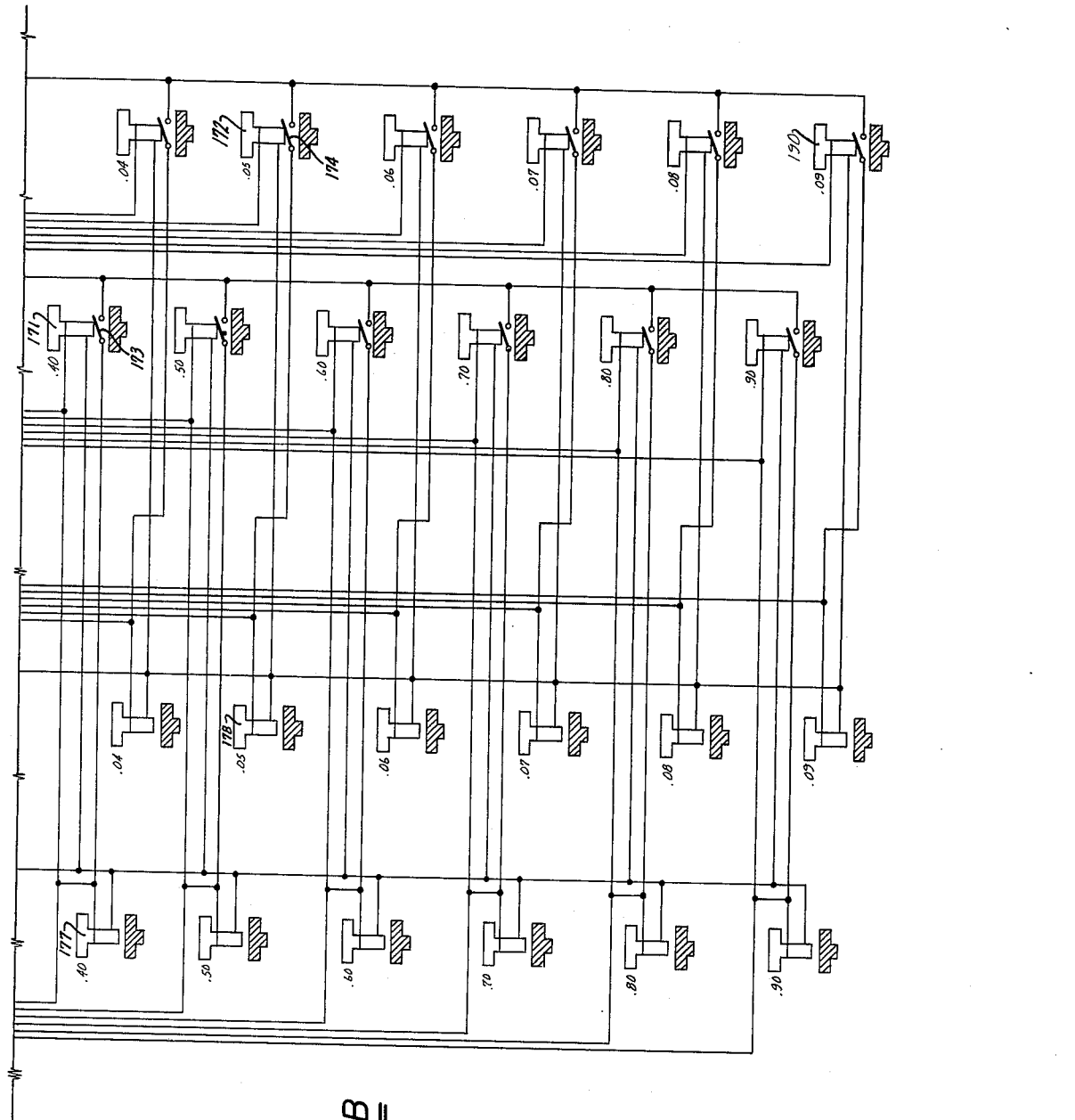

United States Patent Office 3,209,998
Patented Oct. 5, 1965

3,209,998
REGISTERING SYSTEM
Marc T. Worst, 445 Rodriguez del Busto,
Cordoba, Argentina
Filed Aug. 12, 1963, Ser. No. 301,484
2 Claims. (Cl. 235—61)

This invention relates generally to a registering system and more particularly to a registering system including a cash register, scale and computing means so arranged that the weight, price and/or total value of items which are sold by weight are entered into the cash register and indicia corresponding to these parameters is presented in visual and/or printed form. The total value is entered in the registers at random with the value of items which have unit prices.

In supermarkets, many products are sold and purchased on a price-per-pound basis. In the usual course of events, the purchaser selects a quantity of desired products which may, for example, be produce or meat, and delivers the package to a check-out counter. At the check-out counter, the clerk weighs the package on a computing scale and manually enters the total price in the cash register. In such operations, two figures are presented to the customer; first, the weight of the package as shown on the scale, and second, the total price of the package as shown on the register. Although the customer is ordinarily well aware of the price per pound, it is usually a difficult mental calculation to verify that the clerk has used this price-per-pound or has entered into the cash register the proper total price. Moreover, computing scales have a large array of figures on their face and the possibility of an accidental mistake by the clerk in reading is quite evident.

In recent years, to avoid these errors, meats have been prepackaged, weighed and priced. The prepackaged meats, as sold to the customer, include a label showing the weight, price per pound, and total price of the meat at the time of prepackaging. However, between the time the meat is prepackaged and the time it is bought by the customer, there can be shrinkage of its weight; soiling or damage of the package; or a change in price per pound may be desirable. Furthermore, the time consumed by the butcher in prepackaging the meat is costly. In smaller stores, a full time butcher cannot be justified. The customer is not able to select or inspect the cut of meat desired.

Use of the present invention eliminates to a great extent the possibility of human error, and furthermore eliminates the necessity for prepackaging goods which are sold by weight as a means of eliminating these errors.

The invention relates generally to a system for automatically pricing the produce, meats and other goods as they are weighed. The automatically determined price is not only displaced to the customer but is also automatically registered on the cash register itself. The visual display to the customer not only includes the actual weight of the produce but also the price per pound and the total price of the produce or goods. In one particular embodiment of the invention, the weight and price per pound are printed on the cash register receipt so that the customer may verify the correctness of the entry at a later time.

As will become apparent, the registering system of the present invention not only provides the customer with an accurate determination of price but also is an aid to the scale and register user. The clerk must merely insert the pricing rate into the system and is not concerned with the actual weight or total cost since the latter two figures are handled automatically.

In present supermarkets and large grocery stores where meats are prepackaged, a separate machine is required for the prepackaging operation. However, the system of the present invention provides a means whereby the cash register and the scale in the grocery store already in the store may be used also as a prepackaging weighing and computing apparatus. Thus, during off hours, it can be used for prepackaging meats and the like.

The system of the present invention is also useful in stores which have prepackaging machines. The system can employ such prepackaging machines in conjunction with a cash register whereby when the prepackaging machine is not used for prepackaging meats and the like, it may be used at the check-out stand for weighing produce and other items which are sold by weight and providing data to the cash register for an automatic weight-pricing and entry.

It is an object of the present invention to provide an automatic weighing and registering system.

It is a more particular object of the present invention to provide a registering system wherein the goods to be priced by weight are placed on a scale and the price per pound is entered in the system, with the total price being entered automatically into the cash register.

It is another object of this invention to provide a registering system for weight-pricing which displays price per pound and total price, together with the price from other random transactions.

It is still another object of the present invention to provide a registering system for weight-pricing wherein the weight, price per pound, and total price of the produce are automatically printed on the customer's receipt, together with the price from other random transactions.

It is a further object of this invention to provide a registering system which may be used for prepackaging and which provides a prepackage label for insertion on the packages and also provides a total registered value of the prepackaged goods.

It is still a further object of the present invention to provide a registering system and apparatus which may be used with existing machines in grocery stores and the like to provide an automatic system of the character described.

The foregoing and other objects of the present invention will become clear and apparent upon reading of the following description in conjunction with the accompanying drawings in which:

FIGURE 11 is a view showing the sensor used in conjunction with the calculator of the system, FIGURE 4;

FIGURE 13A and 13B are a schematic circuit diagram of the system;

FIGURE 14 is a side elevational view of a cash register and memory device for prepackaging; and FIGURE 15 is a front elevational view of the register and memory device.

Figure 1:
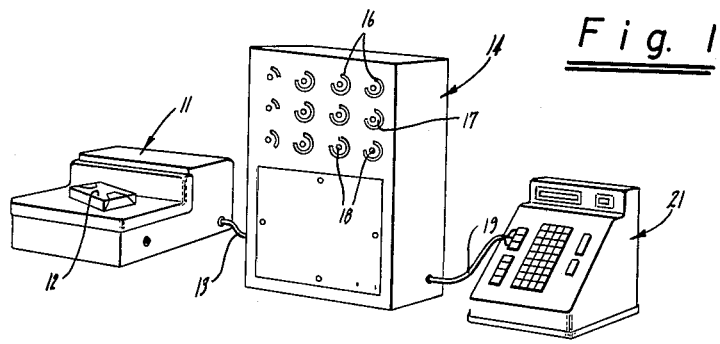
FIGURE 1 is a perspective view of a registering system in accordance with one embodiment of the present invention.

The system shown in FIGURE 1 includes a scale 11 which provides an electrical output signal indicative of weight of the object 12 along the line 13 to a computing apparatus 14. The computing apparatus includes means for entering therein pricing information. The entry means illustrated comprises a plurality of knobs 16. The computer 14 also includes dials 17 which provide an indication of the weight of the goods 12 placed on scale 11. The computing means also includes dials 18 which provide an indication of the price of the object, that is, the weight times the price per pound entered by the clerk through knobs 16. Output signals from the computer may be applied along the line 19 to a cash register 21.

Figure 2:
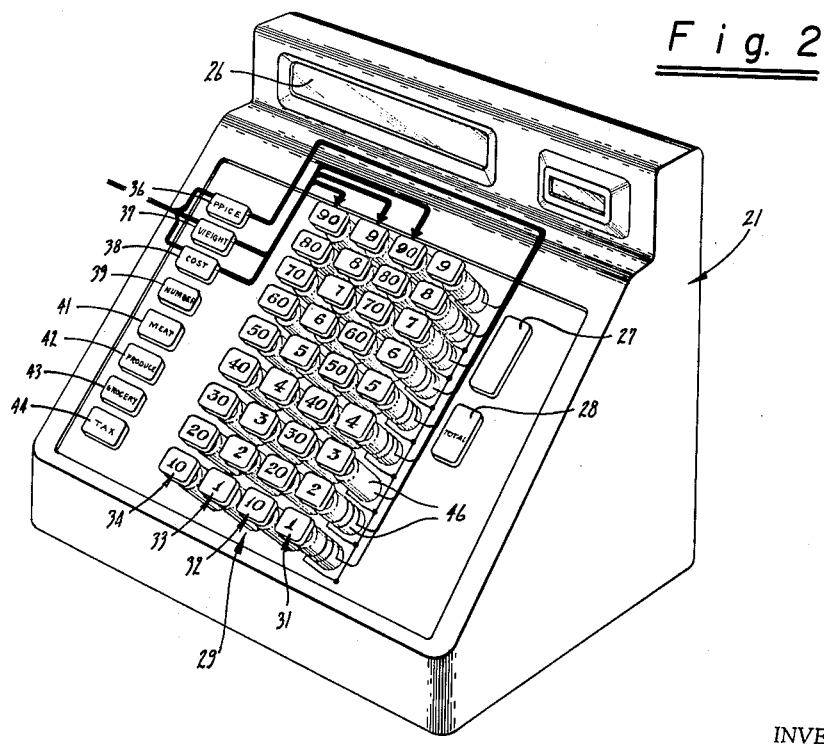
FIGURE 2 is an enlarged perspective view of a cash register employed in the system of FIGURE 1.

Referring more particularly to FIGURE 2, an enlarged view of a suitable cash register 21 is shown. The cash register includes a window 26 in which the various figures entered in the keyboard are displayed both to the clerk and to the customer. The cash register shown includes a motor bar 27, a total key 28, and a plurality of amounts entry keys 29 which may, for example, include a hundredths row 31, a tenths row 32, a unit row 33 and a tens row 34. The cash register also includes a price key 36, a weight key 37, and a cost key 38. The cash register may also include classification keys 41, 42, 43 and 44 for meats, produce, groceries and tax, respectively.

The price key, as will be presently described, may be depressed and serves to provide an electrical connection between the computer 14 and the various solenoids 46 associated with the amount keys 29 to enter into the cash register a price per pound which has been previously entered into the computing system by the clerk.

The weight key 37 is depressed to enter into the cash register, by energizing solenoids 29, the weight which is indicated by the scale and appears at the computer 14. Similarly, the key 38 in depressed to enter into the cash register the total price from the computer.

The number key 39 serves, when depressed, to permit printing of the information entered into the keys 29 without entering the amount in the registers of the cash register. The grocery, meat, produce and tax classification keys merely provide means for providing a printed and displayed indicia or classification of the amounts entered into the register (and directing into the correct sub-register of the register).

Figure 3:
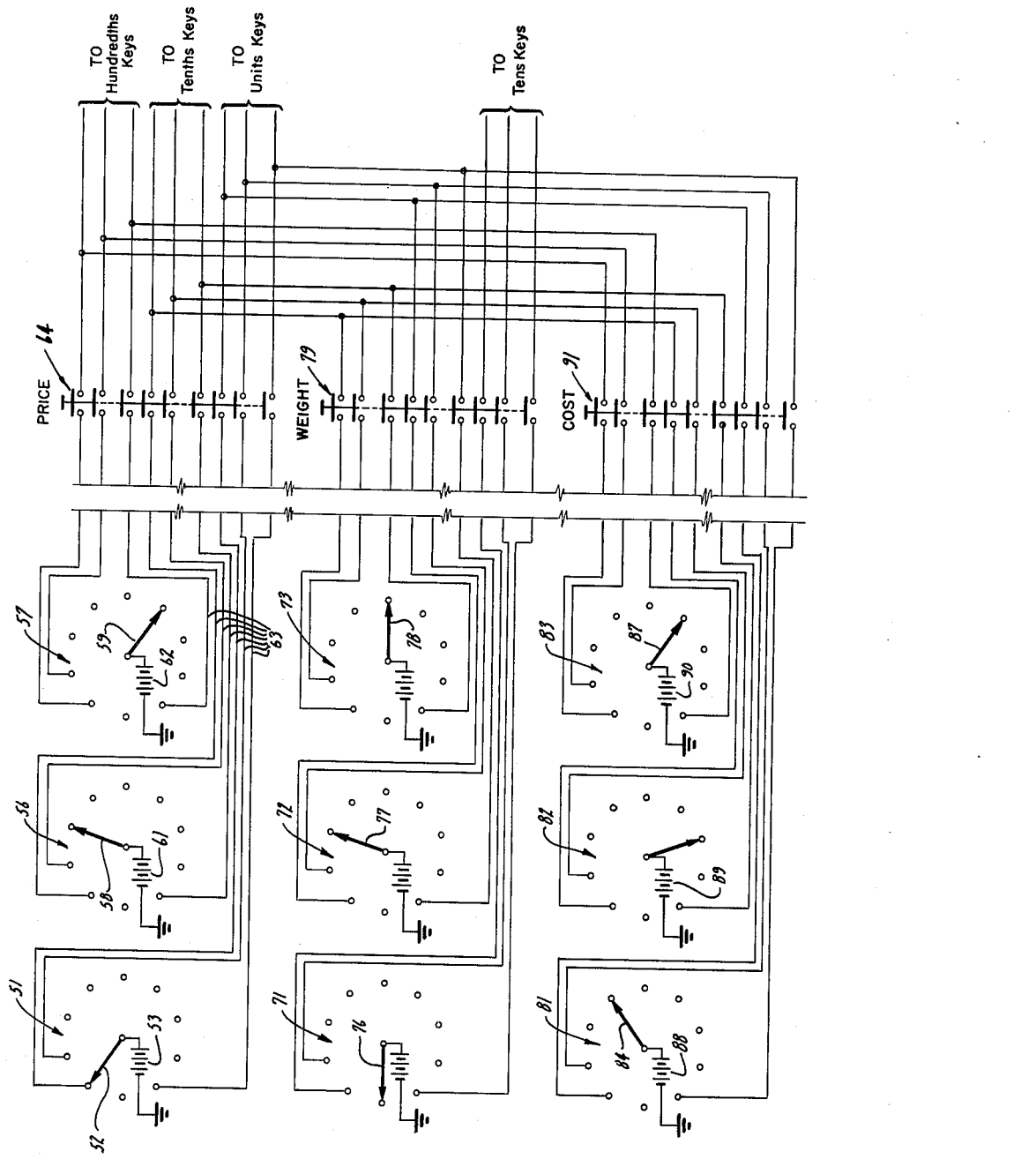
FIGURE 3 shows the logic network used in conjunction with the system shown in FIGURE 1.

Referring now to FIGURE 3, there is shown a circuit which is associated with the computer 14 and register 21 for selectively transmitting data between the computer and the cash register.

The scale 11 and the computer 14 may be of the type shown and described in Patent 2,948,464. The various dials of the computer are associated with electrical output means to provide a numerical electrical signal representative of the dial positions.

Referring more particularly to FIGURE 3, there is shown in the upper part of the figure the three contact assemblies associated with the pricing dials 16. The reference numeral 51 represents the assembly associated with the dollar entry knob and shows three leads associated with one dollar, two dollar and nine dollar numerals, it being understood, of course, that leads are associated with each of the contacts representing a number. The wiper 52 serves to selectively make contact between the battery 53 and one each of the associated contacts, depending upon the dollar entry. Likewise, the switches 56 and 57 include wipers 58 and 59 selectively connecting their respective batteries 61 and 62 to the associated contact points. Referring to the position of the wiper shown, the price entry is $1.36 cents per pound. The various leads 63 are connected with one terminal of a multiple contact 64 switch associated with the price key 36. When the price key is depressed, it completes the circuit between the input leads on the left-hand side and the output leads on the right-hand side which, in turn, lead to the solenoids associated with the hundredths, tenths and units keys 31, 32 and 33. Depression of the price key 36 will, therefore, connect batteries 53, 61 and 62 to the solenoids to energize them and depress the keys 31, 32 and 33 corresponding to the position of the wipers. In the example, the hundredths key number 6, the tenths key number 3 and the units key number 1 are so depressed.

Similar switches 71, 72 and 73 are associated with the weight indicators 17 and include rotating wipers 76, 77 and 78 which serve to selectively connect their respective batteries to the various terminals associated therewith. These terminals are connected through the weight switch 79 to the respective units and tens keys solenoids of the cash register. Depression of switch 79 will, therefore, activate the solenoids to depress the respective keys in response to the weight being indicated on the computer 14. In the example shown, the units key number 3 and tenths key number 5 are depressed by the respective solenoids to indicate 3.5 pounds.

The lower portion of the figure illustrates the multiple contact switches 81, 82 and 83 associated with the output or total computed price dials from the computer. Each of the switches likewise includes wipers 84, 86 and 87 which serve to selectively connect the respective batteries 88, 89 and 90 through the cost or total price switch 91 to the respective hundredths, tenths and unit key solenoids. In the example described thus far, the dials 18 of the computer will indicate the product of $1.36×3.5 or the value $4.76 for the price. Thus, the hundredths key 6, the tenths key 7 and the units key 4 are depressed by the respective solenoids to indicate $4.76.

Thus, when a package 12 is placed on the scale 11, numerical or like information is transmitted on a line 13 to the computer 14. Various means are known in the prior art for obtaining electrical signals corresponding to the weight. For example, Patent 2,948,464, referred to above, shows such a system, as well as Patent 2,376,234. The computer 14 responds to the automatically entered weight data and the manually entered price data to give a total price.

The following is an illustrative example of the use of the system in a grocery store. The package to be weight-priced is placed on the scale 11 and the clerk enters the price per pound into the computer by manipulating the knobs 16. For example, the price just described is $1.36 per pound. The clerk then depresses the price key 36 which serves to energize the respective solenoids 1, 3 and 6 associated with the keyboard to depress the keys thereon. This displays the price per pound at the window 26. The clerk then depresses the number key 39 and motor bar 27. The register undergoes a cycle of operation and prints upon the tape the value 1.36. Depression of the price key 36 also serves to position a printing wheel to print the word "price" or a similar indicative symbol. Depression of the number key 39 inhibits entry of this information into the totalizing registers.

The clerk then observes and sees that the scale is stabilized and depresses the weight key 37. Depression of weight key 37 serves to energize the 3 and 5 associated with the units and tenths keys to depress the respective keys 33 and 32. The clerk then depresses the number key 39 and the motor bar 27 and the cash register will print on the tape the number 3.5. Depression of the weight key will also serve to provide a printed symbol identifying the entry as weight. Again, the information is not entered in the totalizing registers.

The clerk next depresses the cost key 38 and the meat or produce classification key 41 or 42 and the motor bar 27. An indication of the cost is shown at the window 26, the cost is printed on the tape and entered in the totalizing register, and a classification mark is also printed on the tape. It is observed that if costs of other items such as canned goods, sundries and the like, are to be entered, the clerk merely depresses the respective price keys, correct classification key and the motor bar to display the price, print it on the tape and enter it into the totalizers.

Thus, the cash register is useful for random entry, that is, entry of price per pound, weight and total cost, as well as prices of cans, etc. In weight-priced items, there is presented to the housewife not only price per pound but also the weight and total cost whereby the housewife is assured of the correctness of the transaction. Clearly, the computer properly adjusted cannot be in error. The scale is checked by the weights and standards authorities and, therefore, the only possibility for error is the human clerical error in setting the price per pound dials; and now the housewife has an immediate visual and printed checkup against this error.

It is also apparent that if the scale is to be used for prepackaging goods, the clerk may set in the value once in the dials 16 and sequentially depress the price, weight and cost keys to provide a tape having the requisite price per pound, weight and cost for affixing to the prepackaged goods.

It is further apparent that the switches 51, 56 and 57 may be key type switches rather than rotary type switches. Further, these switches might be located at the keyboard of 21 to thereby provide a cash register system of the character described which can be operated at one position by an operator. The pricing per pound information can be electrically transmitted to the computer.

Figure 4:
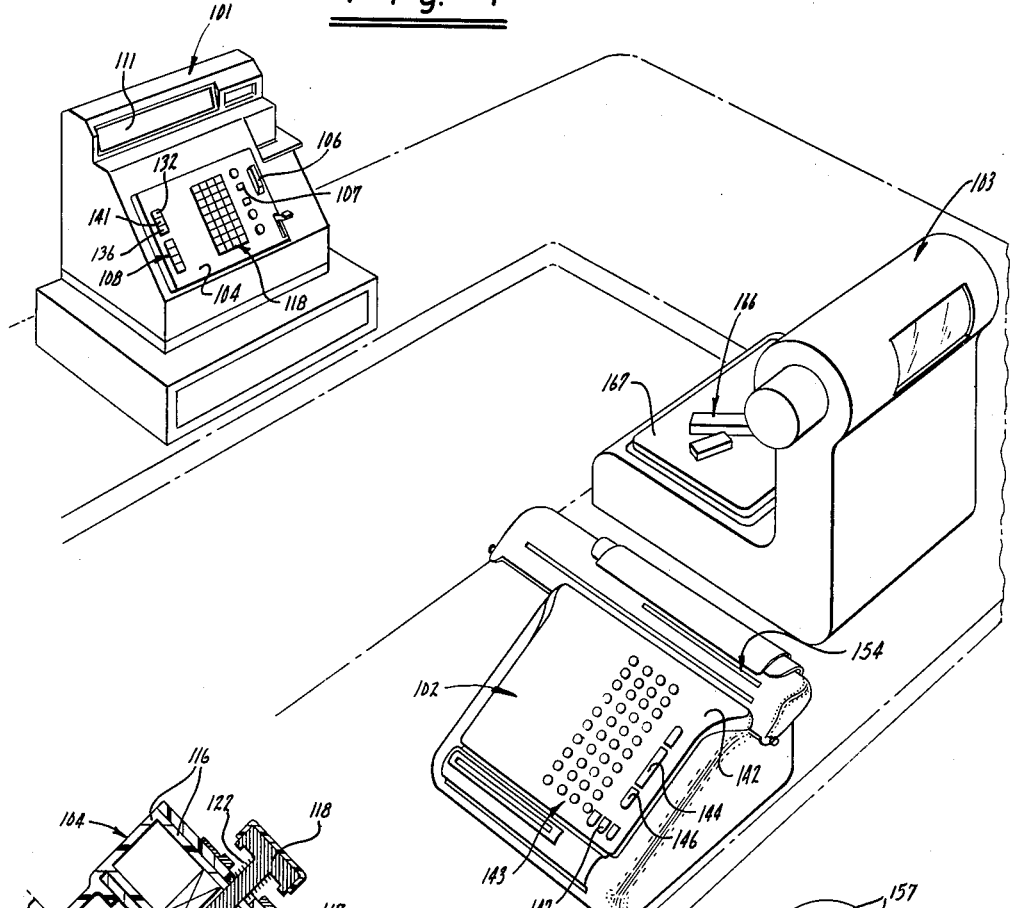
FIGURE 4 is a perspective view of another grocery check-out system in accordance with the invention.

In FIGURE 4, there is shown another system which includes a cash register 101, which may be of the type manufactured and sold by Monroe/Sweda and known as the Model 46, electrically connected in a manner to be presently described, to a computing machine or calculator 102 such as that manufactured by Corona/Marchant and known as the DeciMagic. The calculator 102 is electrically coupled to the weighing scale 103.

Figure 7:
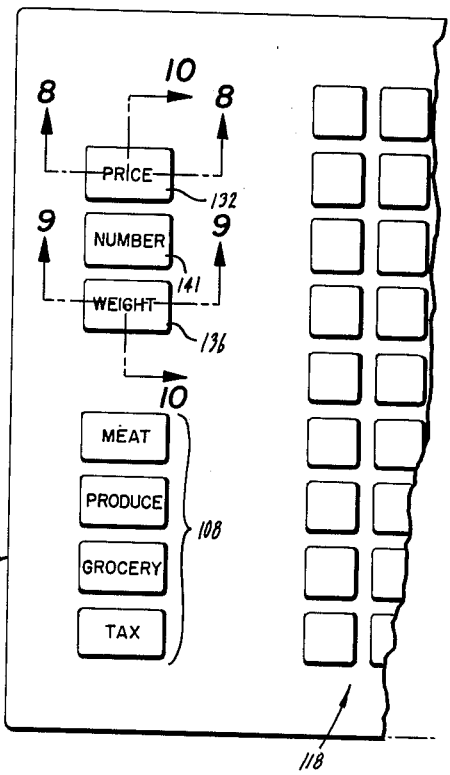
FIGURE 7 shows an enlarged view of a portion of the keyboard of FIGURE 5.

The cash register is modified by the addition of a pad 104 which includes a plurality of solenoid actuated keys 118 which serve to operate the underlying keys 121 of the cash register. The various columns of keys correspond generally to the hundreds, tens, etc. keys. On the right-hand side of the keyboard of 101, there is shown, among others, the motor bar 106 and the total key 107. On the left-hand side of the machine 101 in FIGURE 4 and also FIGURE 7, there are shown four classification keys 108 which may correspond to classifications of meat, produce, groceries and tax. Above these keys are provided three keys which correspond to a price key 132, a number key 141 which serves to cause the machine to merely print data on the tape and to display the same in the window 111 without entering the same into the totalizing registers, and a weight key 136.

Figure 5:
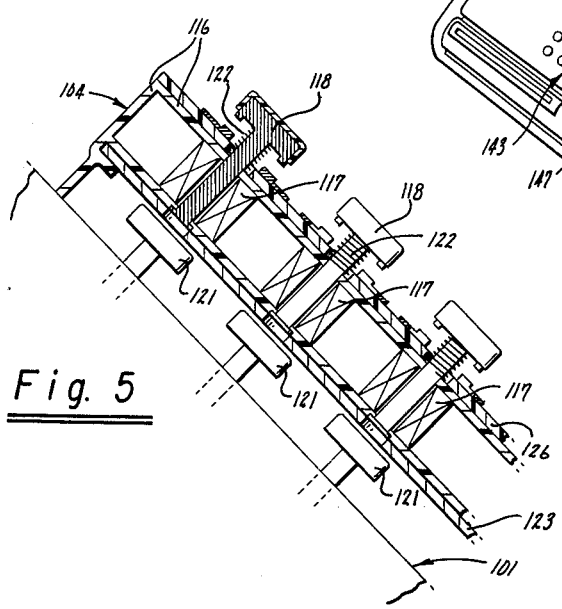
FIGURE 5 is an enlarged view of the solenoid operated keyboard used in the system shown in FIGURE 4.

Referring to FIGURE 5, a portion of the pad 104, referred to above, is shown in enlarged detail in association with the register 101. The pad includes a housing 116, which may be plastic, which houses a plurality of solenoids 117 associated with each of the keys of the cash register. Each of the solenoids 117 cooperates with a dummy key 118 which is urged downwardly when the solenoid is energized to depress the underlying cash register key 121. Each of the dummy keys 118 is urged upwardly by spring 122.

Figure 6:
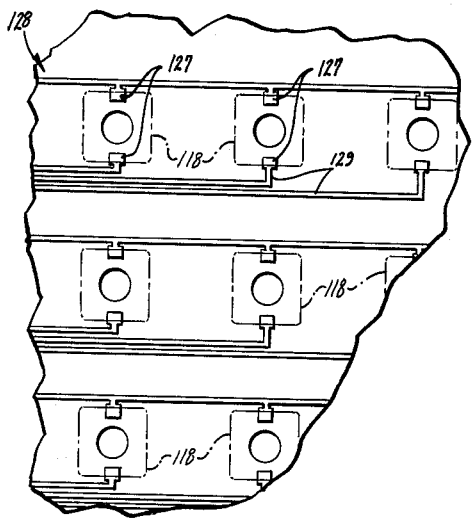
FIGURE 6 is a schematic view of a portion of the printed circuit used in conjunction with the keyboard of FIGURE 4.

Associated with the pad there is provided a movable lockout plate or member 123, to be presently described in detail. Underlying the dummy keys and carried by the housing 116 is a printed circuit board 126 such as that shown in FIGURE 6. The circuit board 126 has formed thereon a plurality of pairs of spaced contact elements 127 which are each associated with a common lead 128 and individual leads 129. Each of these pairs of contact elements 127 underlies a dummy key 118 whereby depression of the key will serve to complete the circuit between the same to energize the associated circuits, to be presently described.

The lockout plate 123 is arranged so that it slides transversely of the machine. In one position, the openings 131 of 123 (FIGURES 5, 8, 9 and 10) underlie the dummy keys 118 whereby depression of these keys, either by the solenoid or manually, will serve to depress the underlying cash register keys 121. In the other position, the lockout plate prevents operation of the register keys 121 through the dummy keys 118. The lockout plate 123 is moved sideways by the depression of the price and weight keys.

Figure 8:
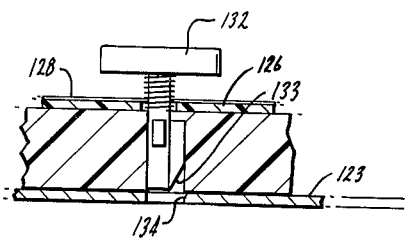
FIGURE 8 is a sectional view taken along the line 8—8 of FIGURE 7 showing the price key and lock-out plate.

Referring more particularly to FIGURE 8, the spring loaded price key 132 is shown including a lower camming surface 133 which, upon depression of the key, engages the surface 134 of the lockout plate 123 to move the same to the right as viewed in the figure.

Figure 9:
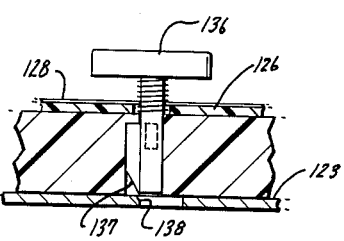
FIGURE 9 is a sectional view taken along the line 9—9 of FIGURE 7 and showing the weight key and lock-out plate.

In FIGURE 9, there is shown the spring loaded weight key 136 having camming surface 137 which engages the surface 138 of the lockout plate and urges the same to the left as indicated by the arrow 139.

Figure 10:
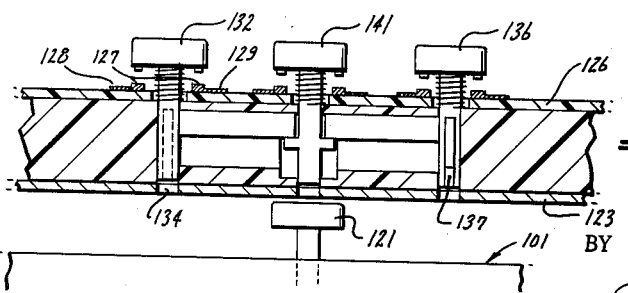
FIGURE 10 is a schematic view taken along the line 10—10 of FIGURE 7 and showing the price, weight and number key of the cash register with arc interlock.

The price, number and weight keys 132, 141 and 136 are interlocked as shown in FIGURE 10. Depression of either the price or weight dummy key serves to depress the dummy number key 141 as well as the accompanying price or weight switch. Depression of the dummy number key 141 serves to depress the underlying number key of the cash register.

The calculating machine 102 includes a solenoid operating pad 142 having dummy keys similar to the pad 104 just described to depress the various keys of the calculator in response to an electrical signal. The machine includes the various amount keys 143 as well as the multiplication key 144, the equal key 146 and the clearing key 147.

Figure 12:
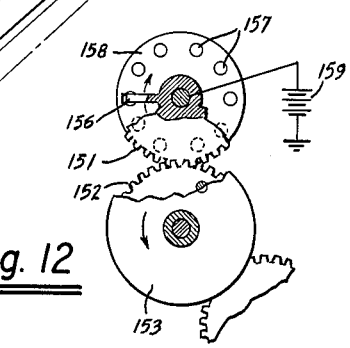
FIGURE 12 is a view taken along the line 12—12 of FIGURE 11.

There is associated with the machine means for obtaining from the machine electrical signals representing the product of price per pound times the weight in pounds. This means may include gears 151 coupled to the gears 152 carried by the numeral wheels 153 of the product register 154. (See Patent No. 3,019,971 for a description of a suitable calculator.) Rotation of the numeral wheel 153 to indicate the product will serve to rotate the gears 152 and 151 which include a movable wiper 156 (FIGURES 11 and 12). Movement of the wiper 156 serves to selectively contact one of the contacts 157 on the disc 158. This connects the battery 159 through the wiper 156 to the terminal contact which, in turn, is associated with a lead to the overall electrical system to be presently described in detail.

Figure 13A:
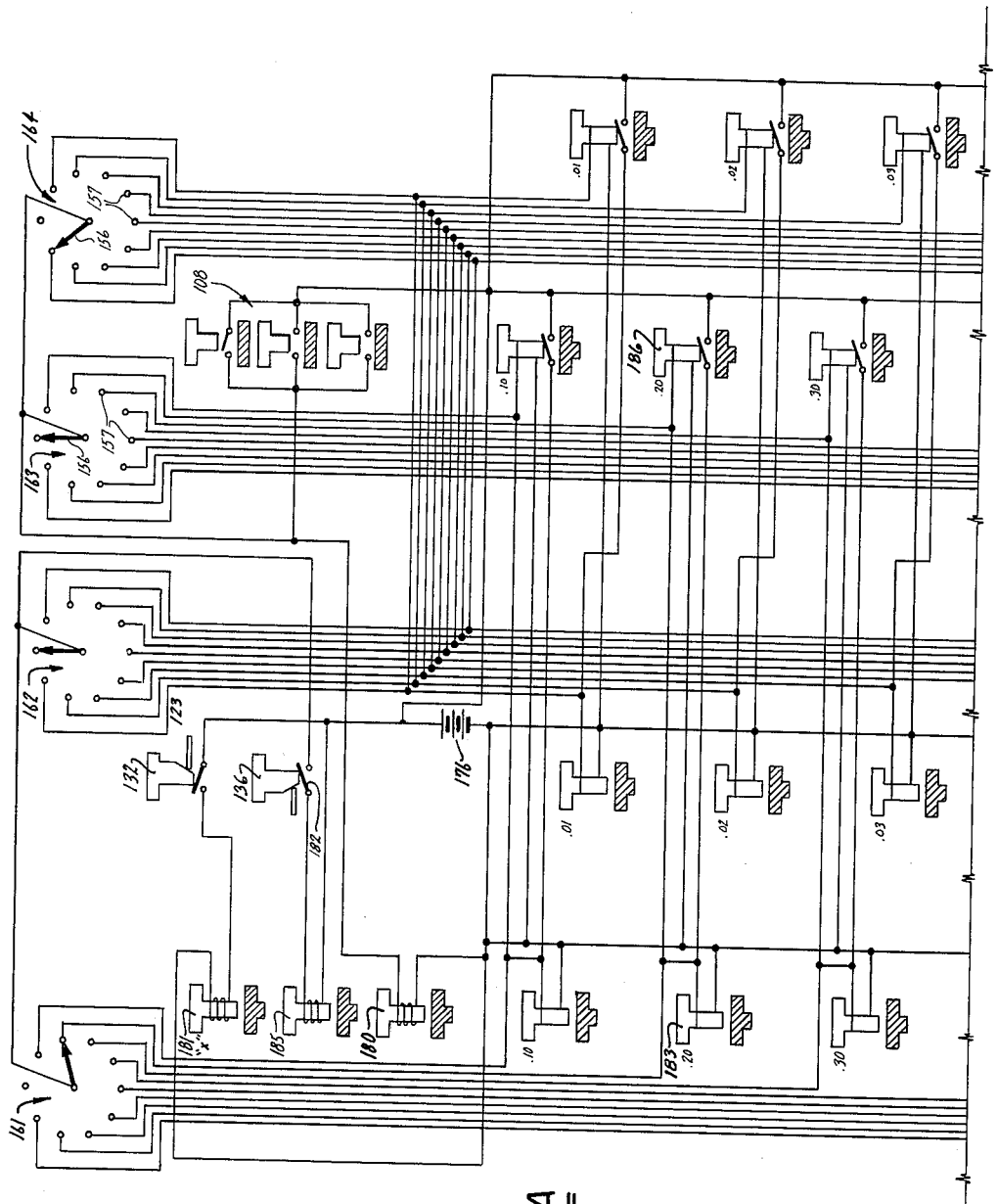

Referring now to FIGURES 13A–13B, there is shown the electrical circuitry together with a schematic representation of the first two decimal orders of the various solenoid operated dummy keys included in the system described above with respect to FIGURES 4–12.

Referring to the upper left-hand side of FIGURES 13A–B, there is shown a switch means 161 and 162 for encoding weight of an object on the scale to provide a decimal output signal to the associated calculator 102. Means for providing an electrical decimal signal of weight in a scale are well known in the art; see, for example, Patents Nos. 2,376,234 and 2,948,964. Rotary switches 163 and 164 represent the switches previously described in FIGURES 11 and 12, associated with the numeral wheels of the calculator. The switches underlying the dummy amount keys 118 are representative of the printed circuit contacts and associated dummy keys previously described in FIGURE 6.

Operation of the circuit shown in this figure may more clearly be understood from tracing through the operation during a typical transaction. The clerk places the goods 166 on the platform 167 of the scale 103 of FIGURE 4. He next punches the correct dummy keys 118 of the cash register to indicate the price per pound of the goods. Depression of the keys 118 will, of course, depress the keys 121 of the cash register and enter the same amount into the cash register. This operation also closes the associated contact elements 127 to complete the particular circuits.

For clarity of understanding, it is assumed that the price is 45 cents per pound. Referring then to FIGURE 13, the dummy keys 171 corresponding to 40 cents and 172 corresponding to 5 cents are depressed by the clerk. This closes the switches 173 and 174. This connects the battery 176 to the solenoids 177 and 178 of the calculator to energize the same. Thus, the respective keys of the calculator are depressed and this amount is entered into the calculator 102.

The clerk then depresses the price button 132 added to the cash register which also depresses the number button 141 of the cash register as shown in FIGURE 10. The clerk then depresses the motor bar 106, and the cash register operates to display at the window 111 the price per pound, in this instance, 45 cents, and print it on the tape together with an identifying indicia. Such indicia are, for example, the words "price" or "per lb.", or letters "PR" or "P", or other.

The depression of key 132, in addition, completes the circuit for the solenoid 181 associated with the "×" key of the calculator. Depression of this key enters the price per pound value into the calculator. Depression of the key 132 additionally moves the lockout plate 123 to inhibit operation of the cash register dummy amount keys 118.

Because the price switch 132 is spring loaded, its closure is followed by an opening as soon as the clerk's finger ceases depressing the same. The solenoids on the calculator 7, which are actuated by closure of this switch, are now deenergized. When the calculator 7 completes its first cycle entry of the first number as initiated by the depression of the "×" key, its normal mechanical action releases all of its keys for entry of the next value.

As soon as the cash register action is completed, the normal mechanical action of the cash register releases the keys and places the cash register in readiness for the next operation. Thus, both the cash register and the calculator are now in readiness for entry of the next value.

The clerk next observes the scale. When it comes to rest, he punches the weight button 136 which causes the following action: It causes the lockout plate 123 to slide and permit use of the cash register dummy amount entry keys 118. Depression of this key also serves to complete the circuits associated with corresponding switch 182.

For purposes of understanding the circuit, assume a particular weight of goods, say .20 pounds as shown by the position of switches 161 and 162. Closure of switch 182 completes the circuit to energize through the switch 161 the solenoid 183 of the .20 key of the calculator. Additionally, the .20 solenoid 186 of the cash register is energized. Since the switch 162 is at zero, no register or calculator key associated therewith is energized.

The number key 141 is also depressed, per FIGURE 10, as weight button 136 is depressed, to display and to print the weight as soon as the motor bar is next depressed by the clerk. The cash register keys then snap out in the normal action. Depression of the weight button also closes a switch which energizes the "=" key of the calculator. The calculator then automatically multiples the weight by the price per pound previously entered to give the resultant product. The action of the calculator will be to rotate the numeral wheels and the sensing assembly, FIGURES 11 and 12, will provide a decimal electrical signal of the product at commutators 163 and 164, in the manner previously described.

The next operation is for the clerk to depress one of the classification keys 108. This completes the circuit through the switch or commutator 164 to the cash register solenoid 186 and enters in the cash register the product 9 cents. The clerk then depresses the motor bar, entering the value in the totalizing registers, displaying the same and printing it on the tape.

Upon completion of this operation, all of the keys both in the calculator and in the cash register are in their released position. If the next item to be entered by the clerk be unit price canned goods or like items not sold by weight, the manual depression of the dummy value entry keys 118 may be done in conventional manner, the grocery classification key and the motor bar will display, print on the tape and enter into the registers the amount. Depression of the classification key closes delay solenoid 180 to activate the clearance key of the calculator to bring the product to zero and release all of the keys. This occurs at each activation of a classification key so that any currents entered in the calculator will be cleared following a transaction.

Where the goods to be weight-priced are sold in units of two, three, etc. pounds for a given price, an additional keyboard may be included which enters the reciprocal into the calculator. This can be in the form of circuits associated between the additional keys and the solenoids of the calculator. For example, the "three pounds for" key would be connected to a switch which energizes the .3 solenoid and the .03 solenoid of the calculator.

The price per pound is then entered into the register as described above and the "×" key can be depressed. This will provide the desired product (price per pound). This product is entered into the cash register from the switches 163 and 164. Depression of the motor bar prints this value on the tape. The value is also entered into the calculator. Subsequent operation is as previously described.

Thus, there is provided a system in which both weighed items and unit price items such as canned goods, sundries and the like, may be selectively entered into a cash register which presents a total entry of the various values. If desired, the system may be employed to provide not only the total amount of weighed goods but also to provide a display and printing of the weight and the price per pound, and the same could thereby give the housewife a check on the clerk and also to increase overall accuracy and speed of the check-out operation.

In order to simplify the use of the system when it is used for prepackaging, a mechanical memory device may be used with the cash register. Referring to FIGURES 14 and 15, a suitable device is shown. The device is pivotally and removably secured to the register by a hinge 251. By removing the hinge pin, it may be removed. The device includes a plate 252 provided with slots which carry movable buttons 253. The buttons include a lower extension 254 which depress the underlying key 118. Thus, a particular price per pound can be preset by manipulating the buttons 253. By pressing the plate 252 downwardly, the respective keys are actuated and the price per pound is entered in the register and into the calculator as previously described. Further depression depresses the number key 39 with the tab 256 and the motor bar 27 with the tap 257. This enters the price per pound in the tape. The goods are then placed on the scale. When the scale comes to rest, the clerk depresses the motor bar plate 258 which includes tab 259. This serves to depress the number key and print the weight on the tape.

The clerk then depresses the classification plate 261 which has a movable button 262 carried in slot 263. The button includes an extension which activates the underlying classification key. This enters the weight price product into the registers, as previously described. The motor bar is activated by depression of plate 258 through the tab 266 of the plate 261 and the total price is printed on the tape. Thus, there is produced a tape which has the price per pound, the weight and the total price. This tape can then be affixed to the prepackaged goods. The memory unit simplifies the operation since the clerk needs only depress three plates in the proper sequence.

I claim:
1. A system of the character described comprising a cash register of the type which provides a printed record, a computing means and a weighing means, manipulative means for entering in the cash register selected transactions and weight pricing information, means for entering into the cash register from the weighing means weight information, means for entering said pricing information from said register and weight information into the computer, means for providing total weighed price information from said computer to said register, and means for selectively printing a record of the weight pricing information, the weight, the total weighed price, the selected transaction, and means in said cash register for totalizing the total weight price and selected transaction information, and means responsive to entry of weight pricing information into said register for inhibiting operation of said manipulative means until a total weighed price is computed and provided to said register after a computing operation is initiated.

2. A system as in claim 1 including additionally a memory device for entering weight pricing information repetitively into said cash register.

References Cited by the Examiner
UNITED STATES PATENTS

| | | | |
|---|---|---|---|
| 1,112,388 | 9/14 | Sibley | 177—3 |
| 1,184,330 | 5/16 | Des Jardins | 177—3 |
| 1,335,067 | 3/20 | Malcher | 235—58 |
| 2,014,432 | 9/32 | Gerhold | 235—146 |
| 2,948,464 | 8/60 | Allen | 235—58 |
| 3,034,717 | 5/62 | Werner et al. | 235—146 |
| 3,036,763 | 5/62 | Chall et al. | 235—146 |
| 3,044,563 | 7/62 | Gumpertz et al. | 177—3 |
| 3,044,691 | 7/62 | Allen | 235—58 |

LEO SMILOW, *Primary Examiner.*